US012695722B2

(12) United States Patent
Luo et al.

(10) Patent No.: US 12,695,722 B2
(45) Date of Patent: Jul. 28, 2026

(54) NETWORK TRAFFIC CONTROL METHOD AND RELATED SYSTEM

(71) Applicant: Huawei Cloud Computing Technologies Co., Ltd., Guizhou (CN)

(72) Inventors: Zhaoyu Luo, Gui'an (CN); Mian Guo, Dongguan (CN); Jianbiao Li, Beijing (CN); Wei Deng, Beijing (CN)

(73) Assignee: HUAWEI CLOUD COMPUTING TECHNOLGOIES CO., LTD., Guizhou (CN)

( * ) Notice: Subject to any disclaimer, the term of this patent is extended or adjusted under 35 U.S.C. 154(b) by 95 days.

(21) Appl. No.: 18/606,777

(22) Filed: Mar. 15, 2024

(65) Prior Publication Data

US 2024/0223535 A1     Jul. 4, 2024

Related U.S. Application Data

(63) Continuation of application No. PCT/CN2022/092099, filed on May 11, 2022.

(30) Foreign Application Priority Data

Sep. 16, 2021     (CN) .......................... 202111088857.X

(51) Int. Cl.
*H04L 9/40*                (2022.01)
(52) U.S. Cl.
CPC ................................ *H04L 63/0254* (2013.01)
(58) Field of Classification Search
CPC ............. H04L 63/1416; H04L 63/1425; H04L 63/1408; H04L 63/145; H04L 63/14; H04L 63/1441; H04L 63/1458; H04L 63/1466; H04L 63/1475; H04L 63/1483; H04L 63/1491; H04L 63/16; H04L 63/162; H04L 63/164; H04L 63/166; H04L 63/168; H04L 63/30; H04L 63/302; H04L 63/304; H04L 63/308; H04L 63/306; H04L 63/02; H04L 63/0218; H04L 63/0227; H04L 63/0236; H04L 63/0254; H04L 63/0245; H04L 63/0263; H04L 67/288; H04L 67/2871; H04L 43/062; H04L 43/12; H04L 9/40

See application file for complete search history.

(56)     References Cited

U.S. PATENT DOCUMENTS 8,006,303 B1 *   8/2011   Dennerline ......... H04L 63/1408
                                                                726/23
8,213,313 B1 *   7/2012   Doiron .................. H04L 43/028
                                                                370/254

(Continued)

FOREIGN PATENT DOCUMENTS

CN          110505248 A      11/2019
WO          WO-03094418 A1 *  11/2003 ......... H04L 63/1408

*Primary Examiner* — Michael Simitoski
(74) *Attorney, Agent, or Firm* — Conley Rose, P.C.

(57)                ABSTRACT

A firewall receives bypass traffic obtained by performing a copy operation on the network traffic, and detects a packet in the bypass traffic, to obtain a packet control message. The firewall control module receives the packet control message sent by the firewall, and performs a target operation such as forwarding, discarding, or buffering on a target packet in the plurality of packets. In this method, the firewall deployed in a bypass manner parses data in parallel, and the firewall control module does not need to parse any data.

18 Claims, 6 Drawing Sheets

(56) References Cited

U.S. PATENT DOCUMENTS

| | | | | |
|---|---|---|---|---|
| 8,572,717 | B2 * | 10/2013 | Narayanaswamy | ........................ H04L 63/0254 726/2 |
| 2002/0051448 | A1 * | 5/2002 | Kalkunte | ................. H04L 49/30 370/236 |
| 2005/0226242 | A1 * | 10/2005 | Parker | ................. H04L 45/7453 370/389 |
| 2006/0098675 | A1 * | 5/2006 | Okuno | ................. H04L 49/9094 370/412 |
| 2009/0300751 | A1 * | 12/2009 | Krishnamurthy | ... H04L 63/0227 726/13 |
| 2011/0206064 | A1 * | 8/2011 | Head | ........................ H04L 69/12 370/474 |
| 2012/0110656 | A1 * | 5/2012 | Santos | ................. H04L 63/0263 726/13 |
| 2013/0074184 | A1 * | 3/2013 | Zuk | ..................... H04L 63/0227 726/22 |
| 2013/0308644 | A1 | 11/2013 | Ferguson et al. | |
| 2015/0012999 | A1 * | 1/2015 | Mcgee | ................. H04L 63/0227 726/13 |
| 2015/0029915 | A1 * | 1/2015 | Gobriel | ............. H04W 52/0219 370/311 |
| 2015/0334090 | A1 * | 11/2015 | Ling | .................... H04L 63/1408 726/13 |
| 2016/0219065 | A1 * | 7/2016 | Dasgupta | ............ H04L 63/1441 |
| 2016/0359809 | A1 * | 12/2016 | Phonsa | ............... H04L 63/0218 |
| 2017/0142034 | A1 * | 5/2017 | K | ............................. H04L 45/38 |
| 2017/0279817 | A1 * | 9/2017 | Campbell | ............. H04L 43/022 |
| 2018/0183756 | A1 * | 6/2018 | Bangalore Krishnamurthy | ......... H04L 63/1416 |
| 2018/0337858 | A1 * | 11/2018 | Yang | ...................... H04L 63/20 |
| 2020/0106740 | A1 * | 4/2020 | Bangalore Krishnamurthy | .......... H04L 43/12 |
| 2020/0213359 | A1 * | 7/2020 | Arbel | ...................... H04L 63/20 |
| 2020/0220797 | A1 * | 7/2020 | Suzuki | ................ H04L 61/5069 |
| 2021/0144092 | A1 * | 5/2021 | Zheng | ................... H04L 63/101 |
| 2021/0336928 | A1 * | 10/2021 | Sofer | .................. G06F 21/6263 |
| 2021/0336977 | A1 * | 10/2021 | Udupi Raghavendra | .................... H04L 43/028 |
| 2022/0150152 | A1 * | 5/2022 | Jin | ........................... H04L 43/50 |
| 2022/0255897 | A1 * | 8/2022 | Miele | ................. H04L 63/1425 |
| 2023/0247000 | A1 * | 8/2023 | McDowall | ............. H04L 63/02 726/14 |
| 2023/0291769 | A1 * | 9/2023 | Talur | ....................... H04L 63/20 |

\* cited by examiner

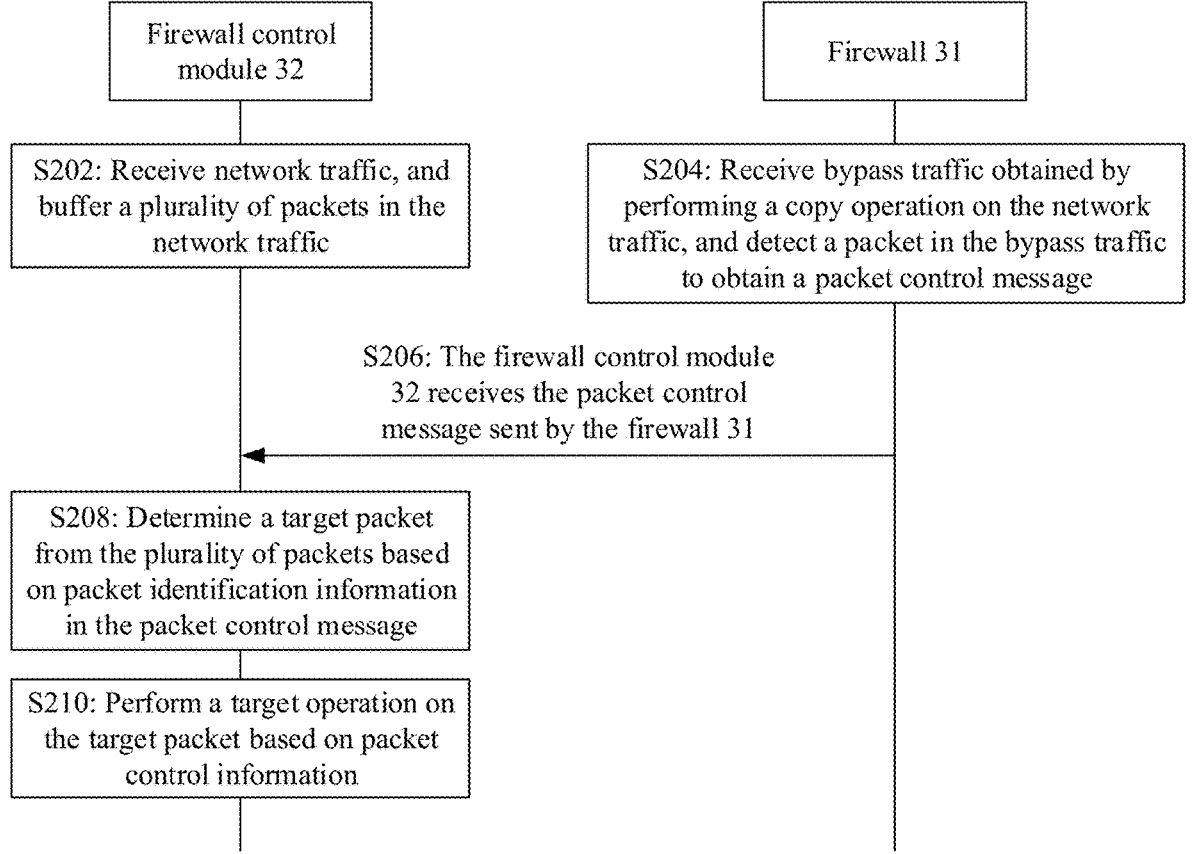

Firewall control
module 32

Firewall 31

S202: Receive network traffic, and
buffer a plurality of packets in the
network traffic S204: Receive bypass traffic obtained by
performing a copy operation on the network
traffic, and detect a packet in the bypass traffic
to obtain a packet control message S206: The firewall control module
32 receives the packet control
message sent by the firewall 31

S208: Determine a target packet
from the plurality of packets based
on packet identification information
in the packet control message S210: Perform a target operation on
the target packet based on packet
control information

CONT.
FROM

Switch

Packet 2

Packet 3

Packet 2

Packet 3

Firewall control module 32

Packet 2

Packet 3

Message 2:
Packet 2: buffering
Packet 3: buffering

Firewall 31

TO

NETWORK TRAFFIC CONTROL METHOD AND RELATED SYSTEM

CROSS-REFERENCE TO RELATED APPLICATIONS

This is a continuation of International Patent Application No. PCT/CN2022/092099 filed on May 11, 2022, which claims priority to Chinese Patent Application No. 202111088857.X filed on Sep. 16, 2021. The disclosures of the aforementioned applications are hereby incorporated by reference in their entireties.

TECHNICAL FIELD

This application relates to the field of computer technologies, and in particular, to a network traffic control method, a system, a firewall, a firewall control module, a computer-readable storage medium, and a computer program product.

BACKGROUND

With popularization of computing devices, especially intelligent terminal devices, more computing devices access an internet, and massive network traffic is generated in the internet. The network traffic means data traffic generated by a device accessing a network on the network.

Considering that unauthorized users use computing devices to access networks to initiate network attacks from time to time, for example, a denial-of-service attack (DoS) and a ransomware attack, the industry proposes a solution of controlling the network traffic based on a firewall to ensure network security.

To block transmission of harmful information, firewalls can be deployed in series in the network, to analyze and control the network traffic in real time. However, the foregoing deployment manner is likely to affect normal forwarding of the network traffic. For example, when the firewall stops forwarding, all network traffic is interrupted, which greatly affects normal operating of services.

SUMMARY

This application provides a network traffic control method. In the method, a firewall deployed in a bypass manner parses data in parallel, and a firewall control module does not need to parse any data. Therefore, this can simplify logic of the firewall control module, improve stability of the firewall control module, reduce impact of the firewall control module on normal forwarding of network traffic, and ensure normal operating of a service. This application further provides an apparatus, a device, a computer-readable storage medium, and a computer program product corresponding to the foregoing method.

According to a first aspect, this application provides a network traffic control method. The method may be performed by a control system. The control system includes a firewall and a firewall control module. The firewall may be hardware or software having an access control function. The firewall control module may be a hardware module or a software module. When the firewall control module is the software module, the firewall control module may further be integrated in the firewall.

Specifically, the firewall control module receives network traffic, and buffers a plurality of packets in the network traffic. At the same time, the firewall receives bypass traffic obtained by performing a copy operation on the network traffic, and detects a packet in the bypass traffic to obtain a packet control message. When the firewall control module receives the packet control message sent by the firewall, the firewall control module performs a target operation on a target packet in the plurality of packets. The target operation may include forwarding, discarding, or buffering.

In this method, the firewall is deployed in a bypass manner, and operates in parallel with the firewall control module. The firewall control module does not need to parse any data, and the bypass firewall parses data in parallel. In this way, logic of the firewall control module is extremely simple and stable, impact of the firewall control module on normal forwarding of the network traffic is reduced, and normal operating of a service is ensured. In addition, the firewall control module controls corresponding packet forwarding based on the packet control message, to implement packet-level access control. This fine-grained access control improves an effect of access control.

In some possible implementations, the packet control message includes packet identification information and packet control information. The packet identification information uniquely identifies a packet, and the packet identification information may be, for example, a 4-tuple of the packet. The packet control information indicates an operation on the packet. Based on this, the firewall control module may determine the target packet from the plurality of packets based on the packet identification information, and then perform the target operation on the target packet based on the packet control information.

In this method, the firewall generates a packet control message carrying the packet identification information in real time, and sends the packet control message to the firewall control module. In this way, the firewall control module may quickly locate the target packet based on the packet identification information. In this way, the packet-level access control is implemented and network security is ensured.

In some possible implementations, the plurality of packets includes a first packet and a second packet that are associated with each other. The first packet and the second packet may be, for example, a plurality of packets of a same data flow. The packet control message includes packet identification information and packet control information of the second packet, and when the packet control information of the second packet indicates to discard the second packet, the firewall control module may discard the first packet and the second packet. In this way, a packet associated with a packet including harmful content may be blocked, and network security is ensured.

In some possible implementations, the packet control message includes a first packet control message and a second packet control message. The first packet control message includes both packet identification information and first packet control information of the first packet. The first packet control information of the first packet indicates to buffer the first packet. The second packet control message includes the packet identification information and second packet control information of the first packet and the packet identification information and the packet control information of the second packet. The second packet control information of the first packet and the packet control information of the second packet indicate to discard the packet.

When the firewall control module receives the first packet control message, the firewall control module prolongs buffer time of the first packet to wait for a subsequent packet. When the firewall control module receives the second packet control message, the firewall control module discards the first packet and the second packet.

In this way, combined detection may be performed on content of mutually associated packets. This avoids that a packet including harmful content is missed due to independent detection on content of a single packet, and ensures network security.

In some possible implementations, when no packet control message sent by the firewall is received within a preset time period, the firewall control module may further control the plurality of packets based on a preset control policy. Therefore, a fault tolerance rate of network traffic control can be improved, thereby improving robustness of the control system.

In some possible implementations, the preset control policy includes a plurality of control policies. For example, the plurality of control policies may include a strict control policy or a relatively loose control policy. The strict control policy is not to perform forward or discard operations when no packet control message is received. Further, a timeout mechanism may be further set. When buffer time or buffer timeout time of a packet reaches a preset threshold, the packet is discarded. The loose control policy means that a buffered packet is forwarded when a specified condition is met, for example, when a quantity of packets in a buffer queue reaches a preset quantity, or buffer time or buffer timeout time of a packet reaches a preset threshold.

Based on this, the firewall control module may obtain a service identifier from the network traffic. The firewall control module determines, based on a correspondence between a service and a control policy, a target control policy corresponding to a service identified by the service identifier from the plurality of control policies, and then the firewall control module controls the plurality of packets based on the target control policy.

Therefore, the firewall control module may select a corresponding control policy based on a service requirement to perform control. For example, when a service scenario is a scenario requiring relatively high security, the strict control policy may be selected. For another example, when the service scenario is a scenario requiring relatively high stability (for example, some cloud service scenarios), a relatively loose control policy may be selected.

In some possible implementations, the bypass traffic is obtained through optical splitting by an optical splitter, or is obtained through switch mirroring. The optical splitter or the switch copies the network traffic in real time to obtain the bypass traffic. This provides a basis for parallel processing of the bypass firewall and the firewall control module.

According to a second aspect, this application provides a control system. The system includes: a firewall control module configured to receive network traffic, and buffer a plurality of packets in the network traffic; and a firewall configured to receive bypass traffic obtained by performing a copy operation on the network traffic, and detect a packet in the bypass traffic to obtain a packet control message, where the firewall control module is further configured to receive the packet control message sent by the firewall, and perform a target operation on a target packet in the plurality of packets, where the target operation includes forwarding, discarding, or buffering.

In some possible implementations, the packet control message includes packet identification information and packet control information.

The firewall control module is specifically configured to: determine the target packet from the plurality of packets based on the packet identification information; and perform the target operation on the target packet based on the packet control information.

In some possible implementations, the plurality of packets includes a first packet and a second packet that are associated with each other. The packet control message includes packet identification information and packet control information of the second packet, and the packet control information of the second packet indicates to discard the second packet.

The firewall control module is specifically configured to: discard the first packet and the second packet.

In some possible implementations, the packet control message includes a first packet control message and a second packet control message. The first packet control message includes both packet identification information and first packet control information of the first packet. The first packet control information of the first packet indicates to buffer the first packet. The second packet control message includes the packet identification information and second packet control information of the first packet and the packet identification information and the packet control information of the second packet. The second packet control information of the first packet and the packet control information of the second packet indicate to discard the packet.

The firewall control module is specifically configured to: receive the first packet control message, and prolong buffer time of the first packet; and receive the second packet control message, and discard the first packet and the second packet.

In some possible implementations, the firewall control module is further configured to: when no packet control message sent by the firewall is received within a preset time period, control the plurality of packets based on a preset control policy.

In some possible implementations, the preset control policy includes a plurality of control policies, and the firewall control module is specifically configured to: obtain a service identifier from the network traffic; determine, based on a correspondence between a service and a control policy, a target control policy corresponding to a service identified by the service identifier from the plurality of control policies; and control the plurality of packets based on the target control policy.

In some possible implementations, the bypass traffic is obtained through optical splitting by an optical splitter, or is obtained through switch mirroring.

According to a third aspect, this application provides a firewall, where the firewall includes a processor and a memory. The processor and the memory communicate with each other. The memory stores computer-readable instructions, and the processor executes the computer-readable instructions, to enable the firewall to perform the method steps performed by the firewall according to any one of the first aspect or the implementations of the first aspect.

In some possible implementations, the firewall is further integrated with a firewall control module. Correspondingly, the processor executes the computer-readable instructions, to enable the firewall to further perform the method steps performed by the firewall control module according to any one of the first aspect or the implementations of the first aspect.

According to a fourth aspect, this application provides a firewall control module, where the firewall control module includes a processor and a memory. The processor and the memory communicate with each other. The memory stores computer-readable instructions, and the processor executes the computer-readable instructions, to enable the firewall control module to perform the method steps performed by the firewall control module according to any one of the first aspect or the implementations of the first aspect.

According to a fifth aspect, this application provides a computer-readable storage medium, where the computer-readable storage medium stores computer-readable instructions. When the computer-readable instructions are run on a firewall, the firewall is enabled to perform the method steps performed by the firewall according to any one of the first aspect or the implementations of the first aspect.

According to a sixth aspect, this application provides a computer-readable storage medium, where the computer-readable storage medium stores computer-readable instructions. When the computer-readable instructions are run on a firewall control module, the firewall control module is enabled to perform the method steps performed by the firewall control module according to any one of the first aspect or the implementations of the first aspect.

According to a seventh aspect, this application provides a computer program product including instructions, where the computer program product includes computer-readable instructions. When the computer-readable instructions are run on a firewall, the firewall is enabled to perform the method steps performed by the firewall according to any one of the first aspect or the implementations of the first aspect.

According to an eighth aspect, this application provides a computer program product including instructions, where the computer program product includes computer-readable instructions. When the computer-readable instructions are run on a firewall control module, the firewall control module is enabled to perform the method steps performed by the firewall control module according to any one of the first aspect or the implementations of the first aspect.

In this application, based on implementations according to the foregoing aspects, the implementations may be further combined to provide more implementations.

BRIEF DESCRIPTION OF DRAWINGS

To describe the technical methods in embodiments of this application more clearly, the following briefly describes the accompanying drawings used in describing the embodiments.

FIG. 2 is a flowchart of a network traffic control method according to an embodiment of this application;

DESCRIPTION OF EMBODIMENTS

Figure 1:
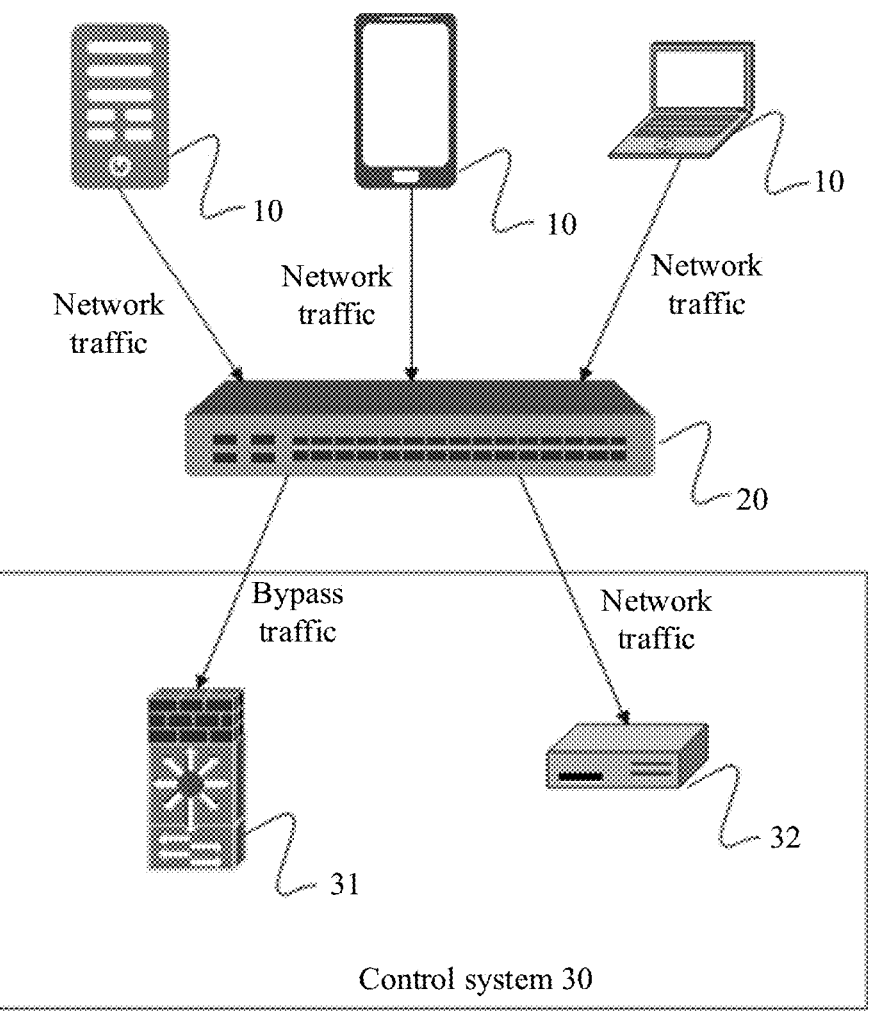
FIG. 1 is a diagram of a system architecture of a network traffic control method according to an embodiment of this application.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

To facilitate understanding of embodiments of this application, some terms in this application are first explained and described.

Network traffic means data traffic generated by devices that can connect to a network. The devices that can connect to the network include network devices such as a server and a terminal. The server includes a cloud server, an edge server, or a local server. The cloud server is a computing device in a cloud environment. The cloud environment indicates a central computing device cluster that is owned by a cloud service provider and that is configured to provide computing, storage, and communication resources. The edge server is a computing device in an edge environment. The edge environment indicates an edge computing device cluster that is relatively close to a terminal (that is, an end-side device) in a geographical location and that is configured to provide computing, storage, and communication resources. The local server is a server in a local data center. The terminal includes but is not limited to a user terminal such as a desktop computer, a notebook computer, a smartphone or the like.

Network traffic control, also called traffic control, is a process of analyzing the network traffic and forwarding or discarding the network traffic based on an analysis result to ensure network security. For example, when an analysis result of network traffic represents that the network traffic is malicious traffic, namely, traffic generated by a network attack initiated by an unauthorized user, a discard operation may be performed on the network traffic, to ensure device security of a network.

A firewall is hardware or software located between a plurality of networks (for example, two networks) to implement network access control. For example, the firewall may be a dedicated network device dedicated to the network access control. For another example, the firewall may be software running on a host, and the host runs the software to check network transmission on each network interface. The firewall can be used to isolate the network. Specifically, the firewall divides the network into different zones (ZONE), and formulates access control policies between different zones to control data flows transmitted between zones with different trust levels. Zones with different trust levels include an internet and an internal network. The internet is an untrusted zone, and the internal network is a highly trusted zone.

Currently, the firewalls can be deployed in series in the network to analyze and control the network traffic in real time. However, the foregoing deployment manner is likely to affect normal forwarding of the network traffic. For example, when the firewall stops forwarding, all network traffic is interrupted, which greatly affects normal operating of services.

In view of this, embodiments of this application provide a network traffic control method. The method may be performed by a control system. The control system includes a firewall and a firewall control module. The firewall may be hardware or software having an access control function. The firewall control module may be a hardware module or a software module. When the firewall control module is the software module, the firewall control module may further be integrated in the firewall.

Specifically, the firewall control module receives network traffic, and buffers a plurality of packets in the network traffic. At the same time, the firewall receives bypass traffic obtained by performing a copy operation on the network traffic, and detects a packet in the bypass traffic to obtain a packet control message. Then, the firewall control module receives the packet control message sent by the firewall, and performs a target operation on a target packet in the plurality of packets, where the target operation includes forwarding, discarding, or buffering.

In this method, the firewall is deployed in a bypass manner, and operates in parallel with the firewall control module. The firewall control module does not need to parse any data, and the bypass firewall parses data in parallel. In this way, logic of the firewall control module is extremely simple and stable, impact of the firewall control module on normal forwarding of the network traffic is reduced, and normal operating of a service is ensured. In addition, the firewall control module controls corresponding packet forwarding based on the packet control message, to implement packet-level access control. This fine-grained access control improves an effect of access control.

The network traffic control method in this application is applicable to a scenario in which real-time security detection is performed on network traffic that has an extremely high requirement on stability, especially a scenario in which the real-time security detection is performed on network traffic in the cloud environment. To make technical solutions of this application clearer and easier to understand, the following describes, with reference to the accompanying drawings, a system architecture of the network traffic control method provided in embodiments of this application.

Refer to a diagram of a system architecture of a network access control method shown in FIG. 1. A network device 10 is connected to a network device 20, and the network device 20 is connected to a control system 30. The network device 10 and the network device 20 may be connected in a wired communication manner, for example, may be connected in a manner such as optical fiber communication. Alternatively, the network device 10 and the network device 20 may be connected in a wireless communication manner. For example, the network device 10 and the network device 20 may be connected in a manner such as a wireless local area network (WLAN), a fifth generation (5G) mobile communication network, BLUETOOTH, ZIGBEE, or the like. Similarly, the network device 20 and the control system 30 may also be connected in the foregoing wired or wireless communication manner.

The network device 10 is a device that generates network traffic. The network device 10 may be, for example, a server, or may be a terminal such as a smartphone, a notebook computer, a desktop computer, or the like. The terminal sends a data access request to the server, to generate network traffic. The network traffic may be a plurality of packets included in the data access request. The server may return a data access response to the terminal, to generate network traffic. The network traffic may be a plurality of packets included in the data access response.

The network device 20 is a device for copying network traffic. FIG. 1 is described by using an example in which the network device 20 is a switch. Specifically, a switch with a port mirroring (port mirroring) function may forward data traffic of one or a plurality of source ports to a specified port to implement network listening. The specified port is also called a mirrored port. The network traffic forwarded by the switch to the specified port is called bypass traffic.

It should be noted that a manner of copying the network traffic is not limited to a manner of port mirroring. In another possible implementation of this embodiment of this application, the network device 20 may also copy the network traffic in another manner. For example, the network device 20 may alternatively be an optical splitter. The optical splitter may obtain a copy of original network traffic through bypass optical splitting. The copy is called bypass traffic. The optical splitter is a passive optical device, and may reallocate a power strength of an optical signal based on a required proportion, to implement network traffic copying.

The control system 30 is configured to perform access control on the network traffic. The control system 30 includes a firewall 31 and a firewall control module 32. In FIG. 1, an example in which the firewall control module is a hardware module, for example, an independent firewall controller is used for description. Specifically, the firewall control module 32 receives the network traffic, and buffers a plurality of packets in the network traffic. The firewall 31 receives bypass traffic obtained by performing a copy operation on the network traffic, and detects a packet in the bypass traffic to obtain a packet control message. The firewall control module 32 receives the packet control message sent by the firewall, and performs a target operation on a target packet in the plurality of packets. The target operation includes forwarding, discarding, or buffering. In some embodiments, the target operation may further include modification. When the packet control message indicates to modify the packet, the packet control message may further include a modification prompt, to facilitate the firewall control module 32 to modify the target packet based on the modification prompt.

Compared with firewalls deployed in series, in this application, a firewall with complex detection logic is deployed in a bypass manner. The firewall 31 deployed in a bypass manner generates a detection result into a packet control message with packet identification information in real time, and sends the packet control message to the firewall control module 32. The firewall control module 32 quickly locates each packet, and performs access control on each packet based on the control message, for example, performs an action such as forwarding, buffering, or discarding.

The following describes in detail the network traffic control method in embodiments of this application from a perspective of the control system 30 with reference to the accompanying drawings.

Refer to a flowchart of a network traffic control method shown in FIG. 2. The method includes the following steps.

S202: A firewall control module 32 receives network traffic, and buffers a plurality of packets in the network traffic.

Specifically, the firewall control module 32 receives network traffic generated when a device such as a terminal or a server accesses a network. The network traffic includes the plurality of packets. The packet may be an internet protocol (IP) packet. The firewall control module 32 maintains a buffer queue. When receiving the plurality of packets, the firewall control module 32 may add the plurality of packets to the buffer queue, to buffer the plurality of packets in the network traffic.

S204: A firewall 31 receives bypass traffic obtained by performing a copy operation on the network traffic, and detects a packet in the bypass traffic, to obtain a packet control message.

The firewall 31 deployed in a bypass manner receives bypass traffic obtained by performing an operation such as port mirroring or optical splitting on the network traffic. The bypass traffic includes a packet that is the same as the foregoing network traffic, and the firewall 31 may detect the packet in the bypass traffic through detection logic. Then, the firewall 31 may generate a packet control message based on a detection result.

Specifically, the firewall 31 may generate a packet control data block based on a detection result of each packet and packet identification information of the packet, and then generate the packet control message based on the packet control data block. The packet identification information uniquely identifies a packet. In some embodiments, the packet identification information includes a source IP, a destination IP, and a packet identifier (ID), for example, an IP ID of an IP packet. Considering that some packets are fragmented, the packet identification information may further include a fragment offset. Based on this, the packet identification information may include a 4-tuple formed by the foregoing four types of information. To accurately and efficiently identify the packet, the packet identification information may further include a port number, for example, at least one of a source port number and a destination port number.

When generating the packet control data block, the firewall 31 may determine packet control information based on a detection result. The packet control information indicates a control operation on a packet. For example, if the detection result represents that the packet is a malicious packet, the packet control information may be discarding, and indicates to discard the packet. For another example, if the detection result represents that the packet is a non-malicious packet, the packet control information may be forwarding, and indicates to forward the packet. Then, the firewall 31 generates the packet control data block based on the packet identification information and the packet control information.

Considering transmission overheads, the firewall 31 may add the packet control data block to a message queue, and then the firewall 31 may pack a plurality of packet control data blocks in the message queue, to generate the packet control message. In this way, the plurality of packet control data blocks can be transmitted once, to reduce the transmission overheads.

It should be noted that, the bypass traffic is obtained by copying the network traffic in real time, for example, is obtained through switch mirroring, or is obtained through optical splitting by an optical splitter. Therefore, S202 and S204 may be concurrently performed.

S206: The firewall control module 32 receives the packet control message sent by the firewall 31.

S208: The firewall control module 32 determines a target packet from the plurality of packets based on the packet identification information in the packet control message.

Specifically, the packet identification information may be the 4-tuple, and the firewall control module 32 may quickly locate, based on the source IP, the destination IP, the IP ID, or the fragment offset in the 4-tuple, the target packet corresponding to the packet identification information from the plurality of packets in the buffer queue.

S210: The firewall control module 32 performs a target operation on the target packet based on the packet control information in the packet control message.

When the packet control information indicates to discard a packet, the firewall control module 32 performs a discard operation on the target packet. When the packet control information indicates to forward a packet, the firewall control module 32 performs a forward operation on the target packet. When the packet control information indicates to buffer a packet, the firewall control module 32 performs a buffer operation on the target packet, for example, may prolong buffer time of the target packet.

S208 to S210 are an implementation in which the firewall control module 32 performs the target operation on the target packet in the plurality of packets. In this embodiment of this application, the firewall control module 32 may alternatively determine the target packet in another manner, and perform the target operation on the target packet.

Based on the foregoing content description, the firewall 31 is deployed in a bypass manner, and operates in parallel with the firewall control module 32. The firewall control module 32 does not need to parse any data, and the bypass firewall parses data in parallel. In this way, logic of the firewall control module 32 is extremely simple and stable, impact of the firewall control module 32 on normal forwarding of the network traffic is reduced, and a service can run normally. In addition, the firewall control module controls corresponding packet forwarding based on the packet control message, to implement packet-level access control. This fine-grained access control improves an effect of access control.

In some possible implementations, the plurality of packets includes a first packet and a second packet that are associated with each other. The associated packets may be combined for detection to determine whether they include harmful content. When detecting that a combination of the first packet and the second packet includes harmful content, the firewall 31 may determine that packet control information of the first packet and the second packet is discarding. The firewall 31 may generate the packet control message based on the packet control information of the first packet and the second packet. Correspondingly, the firewall control module 32 receives the packet control message. The packet control message includes packet identification information and the packet control information of the first packet and packet identification information and the packet control information of the second packet. The firewall control module 32 may discard the first packet and the second packet based on the packet control information.

Specifically, the firewall 31 may first detect content of the first packet. When no harmful content is detected, because the first packet and the second packet are associated, the firewall 31 may determine, based on a detection result, that first packet control information of the first packet is a buffer, to wait for a subsequent packet. The firewall 31 may generate a packet control data block of the first packet based on the packet identification information and the first packet control information of the first packet, and further generate a first packet control message based on the packet control data block of the first packet. The firewall control module 32 buffers the first packet based on the first packet control information of the first packet in the first packet control message, for example, prolongs buffer time of the first packet.

The firewall 31 detects content of the second packet. During detection, the firewall 31 may combine the content of the second packet and the content of the first packet for detection, to determine whether harmful content is included. If the harmful content is included, the firewall 31 determines, based on a detection result, that second packet control information of the first packet and the packet control information of the second packet are discarding. If the armful content is not included, the firewall 31 determines, based on a detection result, that the second packet control information of the first packet and the packet control information of the second packet are forwarding. The firewall 31 may generate the packet control data block of the first packet based on the packet identification information and the second packet control information of the first packet, and generate a packet control data block of the second packet based on the packet identification information and the packet control information of the second packet. Then the firewall 31 generates a second packet control message based on the packet control data block of the first packet and the packet control data block of the second packet. The firewall control module 32 performs a corresponding operation based on the second packet control information of the first packet and the packet control information of the second packet in the second packet control message. For example, when the second packet control information of the first packet and the packet control information of the second packet are forwarding, the first packet and the second packet may be forwarded. For another example, when the second packet control information of the first packet and the packet control information of the second packet are discarding, the first packet and the second packet may be discarded.

For ease of understanding, this application further provides an example to describe packet-level access control in the network traffic.

Figures 3A, 3B:
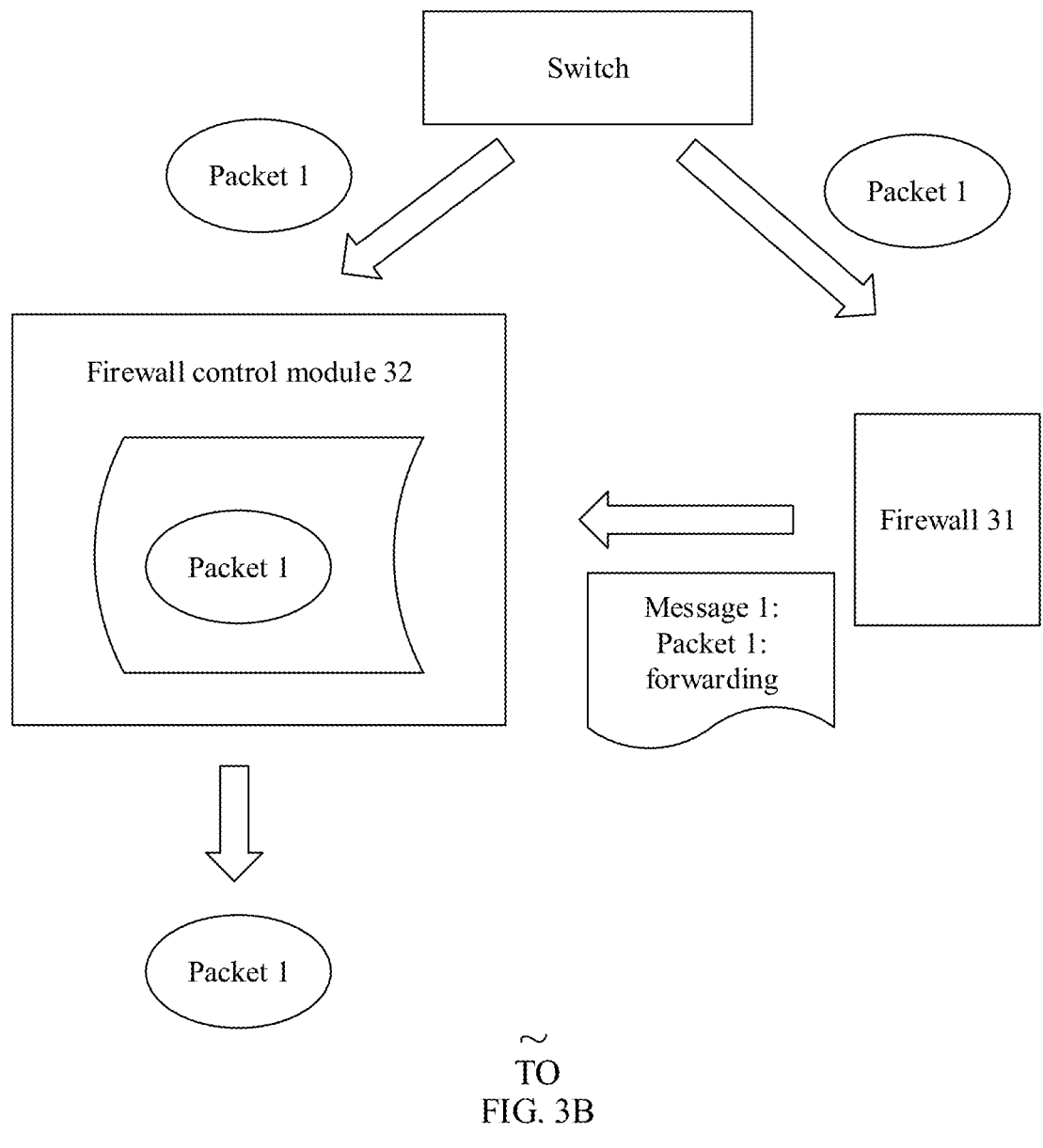
FIG. 3A to FIG. 3C are schematic flowcharts of packet access control according to an embodiment of this application.
Figures 3A, 3B, 3C:
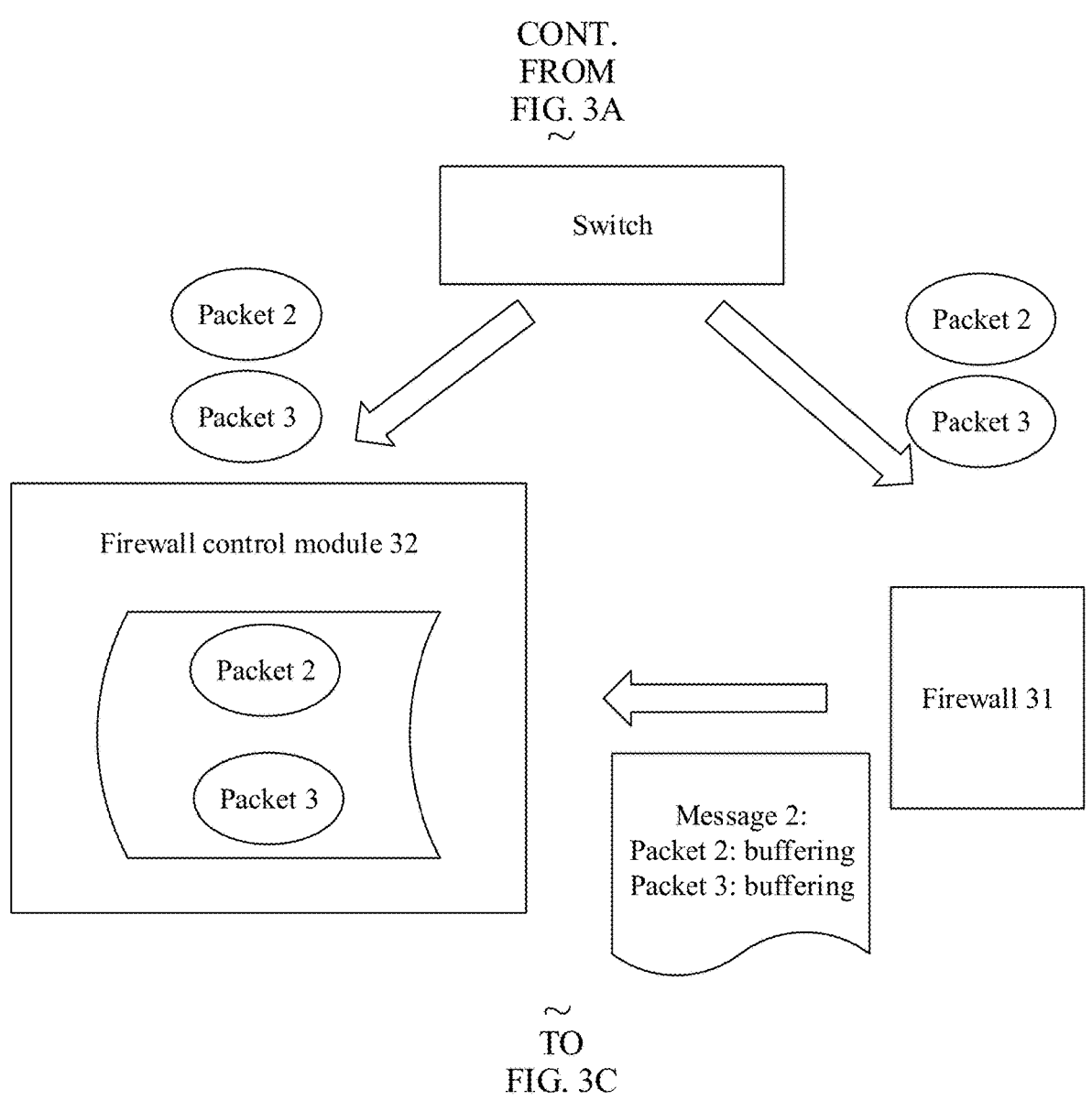
Figure 3C:
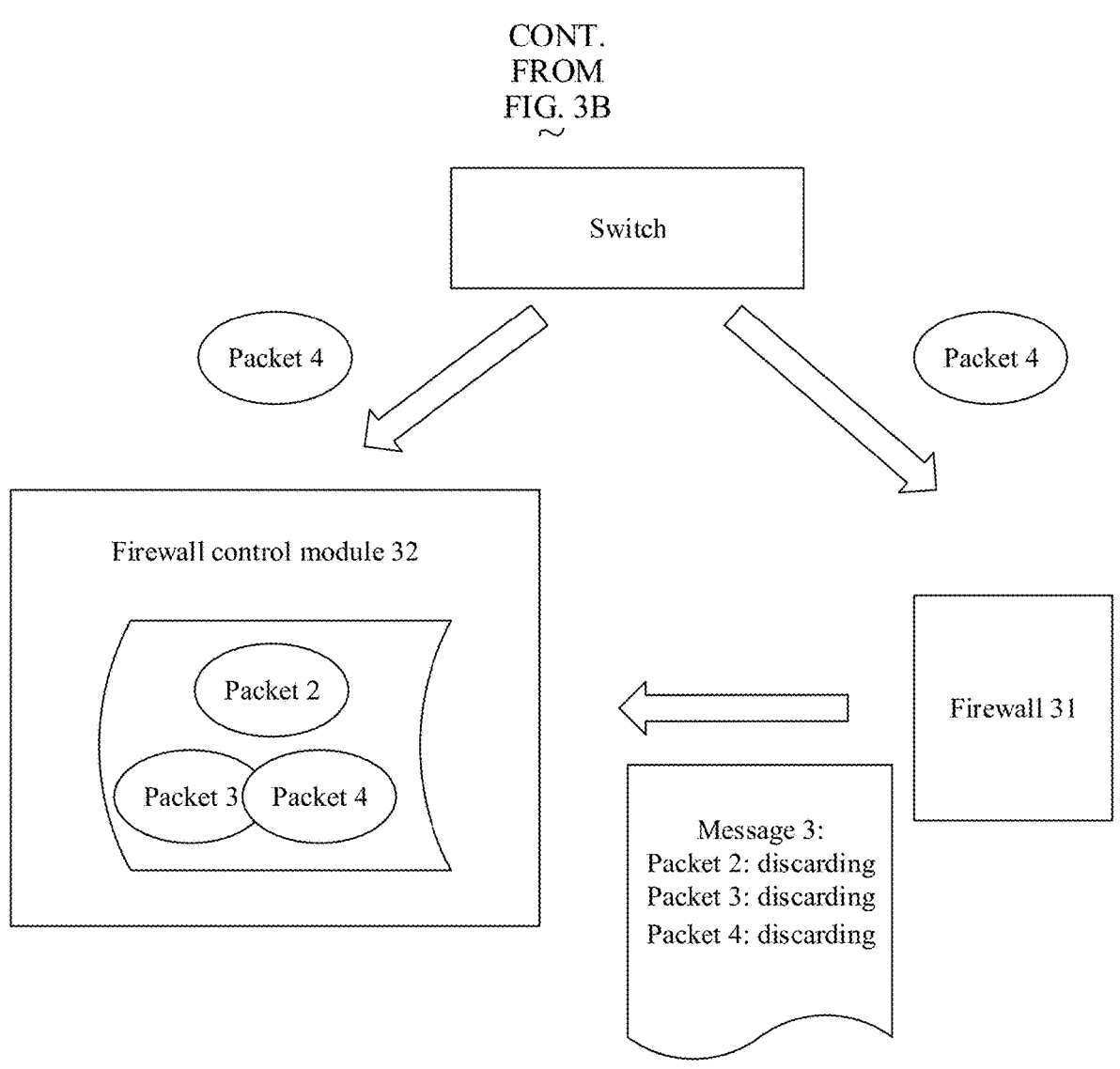

Refer to schematic flowcharts of process of packet control shown in FIG. 3A to FIG. 3C. This example includes four packets, which are specifically four transmission control protocol (TCP) packets, and are denoted as a packet 1, a packet 2, a packet 3, and a packet 4. The packet 2, the packet 3, and the packet 4 are packets associated with each other, for example, packets in a same data flow. It is assumed that the packet 1, the packet 2, the packet 3, and the packet 4 arrive at the firewall 31 (namely, bypass firewall) and the firewall control module 32 (for example, a firewall controller) in sequence.

The firewall 31 first detects the packet 1. When a detection result represents that no harmful content is detected, the firewall 31 may determine, based on the detection result, that packet control information of the packet 1 is forwarding. That is, the firewall 31 permits the packet 1. The firewall 31 generates a packet control data block based on packet identification information and the packet control information of the packet 1, adds the packet control data block to a packet control message, for example, a message 1 shown in FIG. 3A, and sends the packet control message to the firewall control module 32. The firewall control module 32 forwards the packet 1 based on the packet control information of the packet 1 in the message 1.

The firewall 31 then detects the packet 2 and the packet 3. When a detection result represents that no harmful content is detected, because the packet 2, the packet 3, and the packet 4 are associated with each other, the firewall 31 may determine, based on the detection result, that packet control information of the packet 2 and the packet 3 is buffering, to wait for a subsequent packet. The firewall 31 generates a packet control data block of the packet 2 based on packet identification information and packet control information of the packet 2, and generates a packet control data block of the packet 3 based on packet identification information and packet control information of the packet 3. The firewall 31 adds the packet control data blocks of the packet 2 and the packet 3 to the packet control message, for example, a message 2 shown in FIG. 3B, and sends the packet control message to the firewall control module 32. The firewall control module 32 buffers the packet 2 and the packet 3 based on the packet control information of the packet 2 and the packet 3 in the message 2, for example, prolongs buffer time of the packet 2 and the packet 3. It should be noted that extended time may be greater than default buffer time, for example, the extended time may be 1 second.

The firewall 31 then detects the packet 4. Because the packet 4 is associated with the packets 2 and 3, the firewall 31 may combine content of the packet 2, content of the packet 3, and content of the packet 4, and then perform detection. In this example, a detection result represents that harmful content is detected, and it may be determined, based on the detection result, that packet control information of the packet 2, the packet 3, and the packet 4 is discarding. That is, forwarding of the packet 2, the packet 3, and the packet 4 is blocked. The firewall 31 generates the packet control data block of the packet 2 based on the packet identification information and the packet control information of the packet 2, generates the packet control data block of packet 3 based on the packet identification information and the packet control information of the packet 3, and generates a packet control data block of the packet 4 based on packet identification information and packet control information of the packet 4. The firewall 31 adds the packet control data blocks of the packet 2, the packet 3, and the packet 4 to the packet control message, for example, a message 3 shown in FIG. 3C, and sends the packet control message to the firewall control module 32. The firewall control module 32 discards the packet 2, the packet 3, and the packet 4 based on the packet control information of the packet 2, the packet 3, and the packet 4 in the message 3.

The network traffic comes from a TCP connection, and the firewall 31 may also send a reset (RST) packet to terminate the TCP connection and block the packet 2, the packet 3, and the packet 4.

The foregoing embodiment describes a case in which the firewall control module 32 receives the packet control message. In some possible implementations, when the firewall control module 32 does not receive the packet control message sent by the firewall 31 within a preset time period, the firewall control module 32 may further control the plurality of packets based on a preset control policy.

The preset packet control policy includes a plurality of control policies. The following describes different control policies separately.

A first control policy is to strictly wait for the packet control message of the firewall 31. If no packet control message is received, operations of forwarding and discarding the packet are not performed. In addition, a timeout mechanism is set. When buffer time (or buffer timeout time) reaches a preset threshold, a buffered packet is discarded.

A second control policy is that when a quantity of packets in a buffer queue reaches a preset quantity, the packets are forwarded in a first-in-first-out order, and the quantity of packets in the buffer queue does not exceed the preset quantity.

A third control policy is that a buffered packet is sent when buffer time (or buffer timeout time) reaches a preset threshold. The preset threshold may be set based on a processing delay of the firewall 31.

The first control policy is applicable to a service scenario that requires high security, for example, may be applied to an internal network service. The second control policy and the third control policy are applicable to a service scenario that requires high stability, for example, may be applied to a public network service.

Based on this, when no packet control message is received within a preset time period, the firewall control module 32 may obtain a service identifier from the network traffic, and then the firewall control module 32 determines, based on a correspondence between a service and a control policy, a target control policy corresponding to a service identified by the service identifier from the plurality of control policies, and then the firewall control module 32 may control the plurality of packets based on the target control policy.

The foregoing describes in detail the network traffic control method in embodiments of this application with reference to the accompanying drawings. The following describes a control system 30 in an embodiment of this application with reference to the accompanying drawings.

Refer to a schematic diagram of a structure of a control system 30 shown in FIG. 1. The control system 30 includes: a firewall control module 32 configured to receive network traffic, and buffer a plurality of packets in the network traffic; and a firewall 31 configured to receive bypass traffic obtained by performing a copy operation on the network traffic, and detect a packet in the bypass traffic to obtain a packet control message, where the firewall control module 32 is further configured to receive the packet control message sent by the firewall, and perform a target operation on a target packet in the plurality of packets, where the target operation includes forwarding, discarding, or buffering.

In some possible implementations, the packet control message includes packet identification information and packet control information.

The firewall control module 32 is specifically configured to: determine the target packet from the plurality of packets based on the packet identification information; and perform the target operation on the target packet based on the packet control information.

In some possible implementations, the plurality of packets includes a first packet and a second packet that are associated with each other. The packet control message includes packet identification information and packet control information of the second packet, and the packet control information of the second packet indicates to discard the second packet.

The firewall control module 32 is specifically configured to: discard the first packet and the second packet.

In some possible implementations, the packet control message includes a first packet control message and a second packet control message, and the packet control message includes a first packet control message and a second packet control message. The first packet control message includes both packet identification information and first packet control information of the first packet. The first packet control information of the first packet indicates to buffer the first packet. The second packet control message includes the packet identification information and second packet control information of the first packet and the packet identification information and the packet control information of the second packet. The second packet control information of the first packet and the packet control information of the second packet indicate to discard the packet.

The firewall control module 32 is specifically configured to: receive the first packet control message, and prolong buffer time of the first packet; and receive the second packet control message, and discard the first packet and the second packet.

In some possible implementations, the firewall control module is further configured to: when no packet control message sent by the firewall is received within a preset time period, control the plurality of packets based on a preset control policy.

In some possible implementations, the preset control policy includes a plurality of control policies, and the firewall control module is specifically configured to: obtain a service identifier from the network traffic; determine, based on a correspondence between a service and a control policy, a target control policy corresponding to a service identified by the service identifier from the plurality of control policies; and control the plurality of packets based on the target control policy.

In some possible implementations, the bypass traffic is obtained through optical splitting by an optical splitter, or is obtained through switch mirroring.

The control system 30 according to this embodiment of this application may correspondingly perform the methods described in embodiments of this application, and the foregoing and other operations and/or functions of the components of the control system 30 are respectively used to implement corresponding procedures of the methods in embodiments shown in FIG. 2 and FIG. 3A to FIG. 3C. For brevity, details are not described herein again.

An embodiment of this application further provides a firewall 31. The firewall may be dedicated hardware, or may be general-purpose hardware deployed with corresponding software, for example, a device such as a host. The following describes in detail a hardware structure of the firewall 31 with reference to the accompanying drawings.

Figure 4:
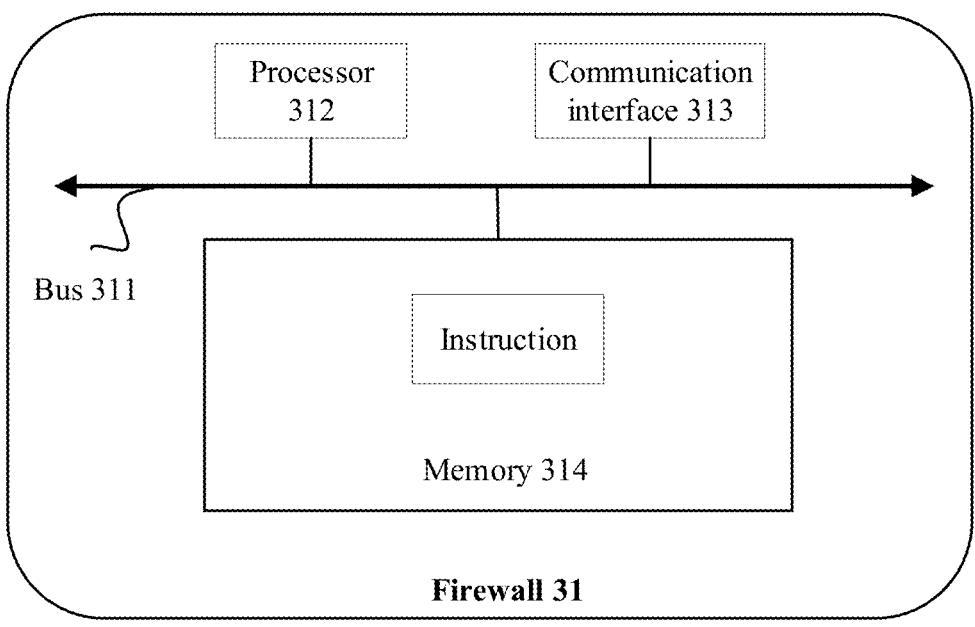
FIG. 4 is a schematic diagram of a structure of a firewall according to an embodiment of this application.

FIG. 4 is a schematic diagram of a structure of a firewall 31. As shown in FIG. 4, the firewall 31 includes a bus 311, a processor 312, a communication interface 313, and a memory 314. The processor 312, the memory 314, and the communication interface 313 communicate with each other through the bus 311.

The bus 311 may be a peripheral component interconnect (PCI) bus, an extended industry standard architecture (EISA) bus, or the like. Buses may be classified into an address bus, a data bus, a control bus, and the like. For ease of representation, only one bold line represents the bus in FIG. 4, but this does not mean that there is only one bus or only one type of bus.

The processor 312 may be any one or more of processors such as a central processing unit (CPU), a graphics processing unit (GPU), a microprocessor (MP), or a digital signal processor (DSP).

The communication interface 313 is configured to communicate with outside. For example, bypass traffic obtained through mirroring the network traffic by the switch is received, and a packet control message is sent to a firewall control module 32.

The memory 314 may include a volatile memory, for example, a random-access memory (RAM). The memory 314 may further include a non-volatile memory, for example, a read-only memory (ROM), a flash memory, a hard disk drive (HDD), or a solid-state drive (SSD).

The memory 314 stores computer-readable instructions, and the processor 312 executes the computer-readable instructions, to enable the firewall 31 to perform the method steps performed by the firewall 31 in the foregoing network traffic control method.

In some possible implementations, the firewall control module 32 may be integrated into the firewall 31, and the processor 312 executes the computer-readable instructions, to enable the firewall 31 to further perform the method steps performed by the firewall control module 32 in the foregoing network traffic control method.

An embodiment of this application further provides a firewall control module 32. The firewall control module 32 may be hardware independent of a firewall 31. The following describes in detail a hardware structure of the firewall control module 32 with reference to the accompanying drawings.

Figure 5:
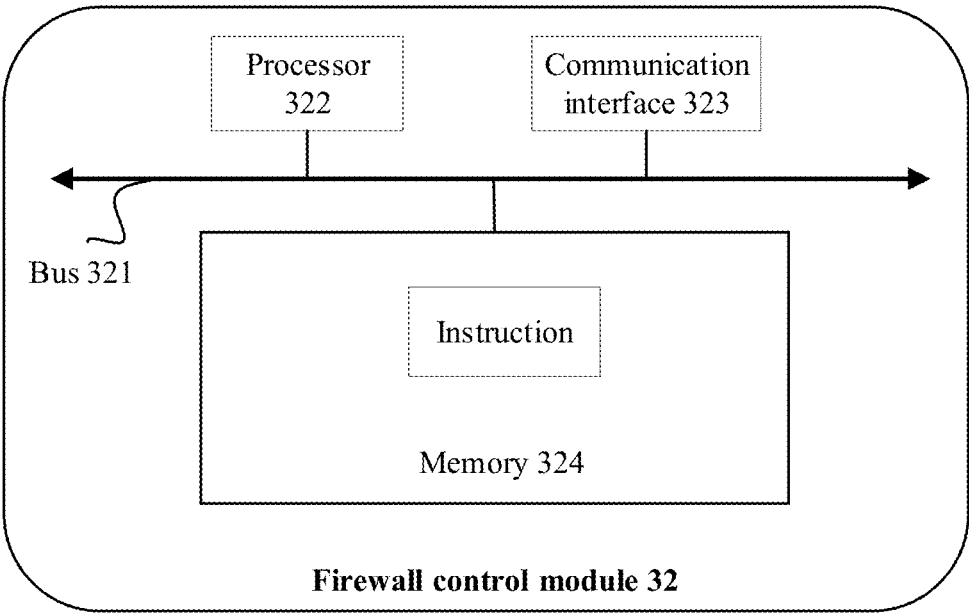
FIG. 5 is a schematic diagram of a structure of a firewall control module according to an embodiment of this application.

FIG. 5 is a schematic diagram of a structure of a firewall control module 32. As shown in FIG. 5, the firewall control module 32 includes a bus 321, a processor 322, a communication interface 323, and a memory 324. The processor 322, the memory 324, and the communication interface 323 communicate with each other through the bus 321. For implementation of the bus 321, the processor 322, the communication interface 323, and the memory 324, reference may be made to related content in FIG. 4.

In this embodiment, the memory 324 stores computer-readable instructions, and the processor 322 executes the computer-readable instructions, to enable the firewall control module 32 to perform the method steps performed by the firewall control module 32 in the foregoing network traffic control method.

An embodiment of this application further provides a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a digital versatile disc (DVD)), a semiconductor medium (for example, a solid-state disk), or the like. The computer-readable storage medium includes instructions. When the instructions are run on a firewall 31, the firewall 31 is further enabled to perform the method steps performed by the firewall 31 in the foregoing network traffic control method.

An embodiment of this application further provides another computer-readable storage medium. The computer-readable storage medium includes instructions. When the instructions are run on a firewall control module 32, the firewall control module 32 is enabled to further perform the method steps performed by the firewall control module 32 in the foregoing network traffic control method.

An embodiment of this application further provides a computer program product. The computer program product includes one or more computer instructions. When the computer instructions are loaded and executed on a firewall 31 or a firewall control module 32, procedures or functions according to embodiments of this application are all or partially generated.

The computer instructions may be stored in a computer-readable storage medium, or may be transmitted from one computer-readable storage medium to another computer-readable storage medium. For example, the computer instructions may be transmitted from a website, a computer, or a data center to another website, computer, or data center in a wired (for example, a coaxial cable, an optical fiber, or a digital subscriber line (DSL)) or wireless (for example, infrared, radio, or microwave) manner.

The computer program product may be a software installation package. When any method in the foregoing network traffic control method is to be used, the computer program product may be downloaded and executed on a computing device.

Descriptions of procedures or structures corresponding to the accompanying drawings have respective focuses. For a part of a procedure or a structure that is not described in detail, refer to related descriptions of other procedures or structures.

What is claimed is:

1. A method comprising:
   receiving, by a firewall controller of a control system, network traffic;
   buffering, by the firewall controller, a plurality of packets in the network traffic, wherein the plurality of packets comprises a first packet and a second packet that are associated with each other;
   receiving, by a firewall of the control system, bypass traffic based on a copy operation on the network traffic;

detecting a packet in the bypass traffic in order to obtain a detected packet;
   generating a packet control message based on the detected packet, wherein the packet control message comprises:
      a first packet control message comprising both first packet identification information and first packet control information of the first packet; and
      a second packet control message comprising the first packet identification information, the first packet control information, second packet identification information, and second packet control information of the second packet;
   receiving, by the firewall controller, the packet control message from the firewall; and
   performing, based on the packet control message, a target operation on a target packet in the plurality of packets, wherein the target operation comprises forwarding, discarding, or buffering,
   wherein when the second packet control information indicates to discard the second packet, performing the target operation on the target packet in the plurality of packets comprises discarding, by the firewall controller, the first packet and the second packet,
   wherein the first packet control information indicates to buffer the first packet, wherein the first packet control information and the second packet control information indicate to discard the first packet and the second packet, and wherein receiving the packet control message from the firewall, and performing the target operation on the target packet comprises:
      receiving, by the firewall controller, the first packet control message;
      prolonging a buffer time of the first packet;
      receiving, by the firewall controller, the second packet control message; and
      discarding the first packet and the second packet.

2. The method of claim 1, wherein performing the target operation on the target packet comprises:
   selecting the target packet from the plurality of packets based on the first packet identification information or the second packet identification information; and
   performing the target operation on the target packet based on the first packet control information or the second packet identification information.

3. The method of claim 1, further comprising controlling, by the firewall controller when no packet control message from the firewall is received within a preset time period, the plurality of packets based on a preset control policy.

4. The method of claim 3, wherein the preset control policy comprises a plurality of control policies, and wherein controlling the plurality of packets based on the preset control policy comprises:
   obtaining, by the firewall controller, a service identifier from the network traffic, wherein the service identifier identifies a service;
   determining, by the firewall controller based on a correspondence between the service and a control policy, a target control policy corresponding to the service from the plurality of control policies; and
   controlling, by the firewall controller, the plurality of packets based on the target control policy.

5. The method of claim 1, further comprising obtaining the bypass traffic through optical splitting by an optical splitter.

6. The method of claim 1, further comprising obtaining the bypass traffic through switch mirroring.

7. A control system, comprising:

a firewall controller configured to:

receive network traffic; and buffer a plurality of packets in the network traffic, wherein the plurality of packets comprises a first packet and a second packet that are associated with each other; and a firewall configured to:

receive bypass traffic based on a copy operation on the network traffic;

detect a packet in the bypass traffic in order to obtain a detected packet;

generate a packet control message based on the detected packet, wherein the packet control message comprises:

a first packet control message comprising both first packet identification information and first packet control information of the first packet; and a second packet control message comprising the first packet identification information, the first packet control information, second packet identification information, and second packet control information of the second packet;

receive the packet control message from the firewall; and perform, based on the packet control message, a target operation on a target packet in the plurality of packets, wherein the target operation comprises forwarding, discarding, or buffering, wherein the first packet control information indicates to buffer the first packet, wherein the first packet control information and the second packet control information indicate to discard the first packet and the second packet, and wherein the firewall controller is further configured to:

receive the first packet control message and prolong buffer time of the first packet; and receive the second packet control message and discard the first packet and the second packet.

8. The control system of claim 7, wherein the firewall controller is further configured to:

select the target packet from the plurality of packets based on the first packet identification information or the second packet identification information; and perform the target operation on the target packet based on the first packet control information or the second packet identification information.

9. The control system of claim 7, wherein the firewall controller is further configured to control, when no packet control message from the firewall is received within a preset time period, the plurality of packets based on a preset control policy.

10. The control system of claim 9, wherein the preset control policy comprises a plurality of control policies, and wherein the firewall controller is further configured to:

obtain a service identifier from the network traffic, wherein the service identifier identifies a service;

determine, based on a correspondence between the service and a control policy, a target control policy corresponding to the service from the plurality of control policies; and control the plurality of packets based on the target control policy.

11. The control system of claim 7, further comprising an optical splitter configured to obtain the bypass traffic through optical splitting.

12. The control system of claim 7, further comprising a switch mirror configured to obtain the bypass traffic through switch mirroring.

13. A computer program product comprising instructions that are stored on a non-transitory computer-readable medium and that, when executed by one or more processors, cause a control system to:

receive network traffic;

buffer a plurality of packets in the network traffic, wherein the plurality of packets comprises a first packet and a second packet that are associated with each other;

perform a copy operation on the network traffic to obtain bypass traffic;

detect a packet in the bypass traffic in order to obtain a detected packet;

generate a packet control message based on the detected packet, wherein the packet control message comprises:

a first packet control message comprising both first packet identification information and first packet control information of the first packet; and a second packet control message comprising the first packet identification information, the first packet control information, second packet identification information, and second packet control information of the second packet; and perform, based on the packet control message, a target operation on a target packet in the plurality of packets, wherein the target operation comprises forwarding, discarding, or buffering, wherein when the second packet control information indicates to discard the second packet, performing the target operation on the target packet in the plurality of packets comprises discarding the first packet and the second packet, wherein the first packet control information indicates to buffer the first packet, wherein the first packet control information and the second packet control information indicate to discard the first packet and the second packet, and wherein the instructions, when executed by the one or more processors, further cause the control system to perform the target operation on the target packet by:

receiving the first packet control message and prolonging buffer time of the first packet; and receiving the second packet control message and discarding the first packet and the second packet.

14. The computer program product of claim 13, wherein performing the target operation on the target packet comprises:

selecting the target packet from the plurality of packets based on the first packet identification information or the second packet identification information; and performing the target operation on the target packet based on the first packet control information or the second packet identification information.

15. The computer program product of claim 13, wherein the instructions, when executed by the one or more processors, further cause the control system to control, when no packet control message is received within a preset time period, the plurality of packets based on a preset control policy.

16. The computer program product of claim 15, wherein the preset control policy comprises a plurality of control policies, and wherein the instructions, when executed by the one or more processors, further cause the control system to control the plurality of packets based on the preset control policy by:

obtaining a service identifier from the network traffic, wherein the service identifier identifies a service;

determining, based on a correspondence between the service and a control policy, a target control policy corresponding to the service from the plurality of control policies; and controlling the plurality of packets based on the target control policy.

17. The computer program product of claim 13, wherein the instructions, when executed by the one or more processors, further cause the control system to obtain the bypass traffic through optical splitting by an optical splitter.

18. The computer program product of claim 13, wherein the instructions, when executed by the one or more processors, further cause the control system to obtain the bypass traffic through switch mirroring.

* * * * *